UNITED STATES PATENT OFFICE.

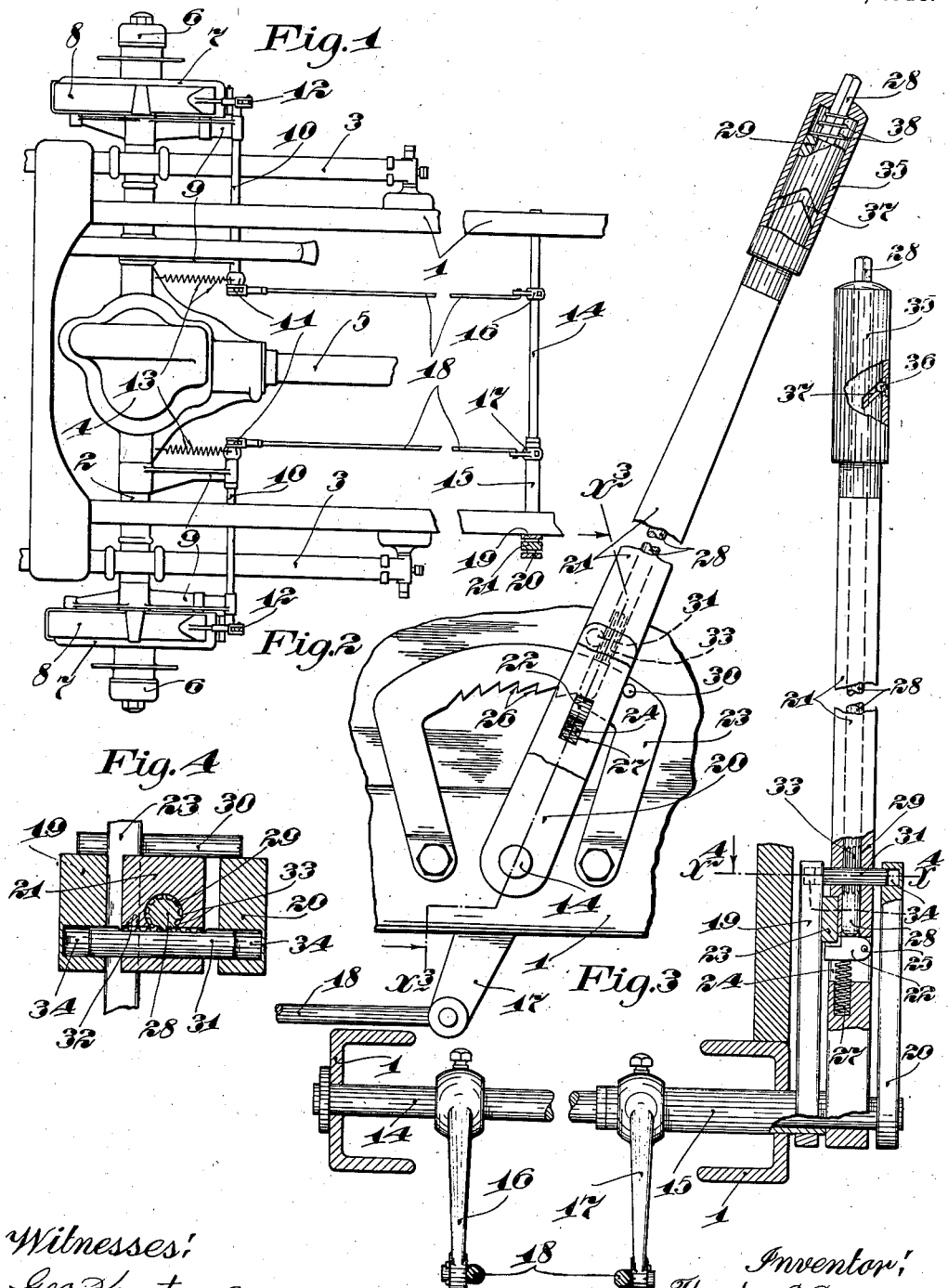

THEODORE N. NYGREN, OF MINNEAPOLIS, MINNESOTA.

BRAKE-ACTUATING MECHANISM.

1,078,107.

Specification of Letters Patent.

Patented Nov. 11, 1913.

Application filed April 7, 1913. Serial No. 759,324.

*To all whom it may concern:*

Be it known that I, THEODORE N. NYGREN, a citizen of the United States, residing at Minneapolis, in the county of Hennepin and State of Minnesota, have invented certain new and useful Improvements in Brake-Actuating Mechanism; and I do hereby declare the following to be a full, clear, and exact description of the invention, such as will enable others skilled in the art to which it appertains to make and use the same.

My invention has for its particular object to provide improved means for actuating the friction brakes of automobiles or power driven vehicles which drive their traction wheels through differential gear mechanism.

In this class of machines, as is well known, if one of the traction wheels happens to stand on a slippery spot, it will tend to whirl at excessive speed and the driving energy will be rendered ineffective to propel the vehicle. Otherwise stated, with a differential driving gear, the vehicle will be properly propelled only when both wheels have good and approximately equal traction and, when the two wheels have not the same traction or frictional engagement with the ground, the driving force is always measured by the traction of the wheel that will first slip. This action frequently causes skidding and turning of the machine on slippery roads, resulting in many serious accidents. Furthermore, it frequently happens that a machine will be stalled because one of the traction wheels drops into a rut, leaving the other wheel nearly or quite free from the ground or where it has very slight tractive force.

My invention provides a simple and effective brake actuating mechanism, whereby, at will, movement of the brake lever may be caused to set either one of the two brakes and thereby lock the desired traction wheel, so that it becomes a base of reaction, causing all of the driving force to be transmitted to the traction wheel that has good frictional or tractive engagement with the ground.

To the above ends, generally stated, the invention consists of the novel devices and combinations of devices hereinafter described and defined in the claims.

The invention is illustrated in the accompanying drawings, wherein like characters indicate like parts throughout the several views.

Referring to the drawings: Figure 1 is a plan view of a portion of the frame and running gear of an automobile, having incorporated therein my invention; some parts being shown in section; Fig. 2 is a detail view principally in side elevation showing a portion of the running gear frame and the brake lever, on an enlarged scale, some parts being broken away and some of the exposed parts being shown in section; Fig. 3 is a view partly in elevation and partly in transverse vertical section, taken on the irregular line $x^3$ $x^3$ of Fig. 2, some parts being broken away and some of the exposed parts being shown in section; and Fig. 4 is a transverse section, taken on the line $x^4$ $x^4$ of Fig. 3.

The numeral 1 indicates the running gear frame supported from the rear axle casing 2 by springs 3, and the numerals 4 and 5 indicate, respectively, the differential gear casing and the engine driven shaft. Rigidly secured to the wheel hubs 6 are the customary brake drums 7, having coöperating brake bands 8. Journaled in bearings 9, projecting from the rear axle casing 4, is a pair of axially alined rock shafts 10. To the inner and outer ends of each rock shaft 10 is rigidly secured, respectively, laterally projecting arms 11 and 12. Coiled springs 13, anchored to the arms 11 and the differential gear casing 4, normally hold the rock shafts 10 in positions that release the brake bands 8 from the brake drums 7. Journaled in the side bars of the frame 1 is the customary rock shaft 14, to which would ordinarily be rigidly secured a brake lever. The parts thus far described may be of the standard or any desired construction.

Referring now to my particular invention, the numeral 15 indicates a short sleeve or hollow shaft telescoped onto one end of the rock shaft 14 and journaled in the adjacent side bar of the frame 1. Laterally projecting arms 16 and 17 are adjustably but rigidly secured, by set screws, respectively, to the rock shaft 14 and to the inner end of the sleeve 15. Long horizontally extended links 18 pivotally connect the free ends of the arms 16 and 17 with those of the arms 11. Ordinarily, both of the arms 16 and 17 would be secured to the rock shaft 14, thus causing the brake bands 8 to be simultaneously operated by the brake lever. Laterally spaced, upwardly projecting arms 19 and 20 are rigidly secured, respectively, to the outer end of the sleeve 15 and to the adjacent outer end of the rock shaft 14.

The lower end of an upwardly projecting brake lever 21 is loosely journaled to the rock shaft 14 between the two arms 19 and 20. A lock dog 22 and segment 23 are provided for locking the brake lever 21 in different adjustments. Said lock dog 22 is mounted in a transverse passage 24, cut in the brake lever 21, is pivotally secured at 25 to said lever, and coöperates with ratchet teeth 26 cut in the lower edge of the segment 23. Seated in the brake lever 21 is a coiled spring 27 that yieldingly holds the lock dog 22 in engagement with the ratchet teeth 26.

A long controller rod 28 is mounted, for limited endwise and rotary movement, in an axial passage 29, formed in the brake lever 21. This passage 29 extends from the top of the brake lever 21 to the passage 24. The upper end of the rod 28 projects above the upper end of the brake lever 21 and its lower end rests on top of the lock dog 22. The projecting upper end of the rod 28 is formed square in cross section, the purpose of which will presently appear. By pressing downward on the rod 28, the lock dog 22 may be moved out of engagement with the ratchet teeth 26, against the tension of the spring 27, thus releasing the brake lever 21 and permitting the same to be returned to normal position. A stop pin 30, passed through the segment 23, limits the forward swinging movement of the arms 19 and 20 and the brake lever 21.

For locking the brake lever 21 to both or either one of the arms 19 and 20, a lock bolt 31 is mounted, for endwise sliding movement transversely through the brake lever 21, at a point just above the segment 23. In one side of this lock bolt 31 is cut a plurality of rack teeth 32, which mesh with gear teeth 33, cut in the controller rod 28. These gear teeth 33 are of sufficient length to permit the required endwise movement of the rod 28 and still keep in mesh with the rack teeth 32. In the inner face of each arm 19 and 20, is formed a lock seat or depression 34, into which the ends of the lock bolt 31 may be projected, to lock the brake lever 21 to either or both of said arms. The lock bolt 31 is of a length sufficient to permit both of its ends to extend into the seats 34 at the same time, thereby connecting the arms 19 and 20 to the brake lever 21; and the seats 34 are of a sufficient depth to permit the lock bolt 31 to be moved out of engagement with one of said seats 34, thereby connecting either the arm 19 or 20 to the brake lever 21 and leaving the other arm free. When the arms 19 and 20 and the brake lever 21 engage the stop pin 30, the lock bolt 31 and seats 34 are axially alined, thereby permitting the lock bolt 31 to be shifted into both or either one of the seats 34.

A hand piece 35, in the form of a cap, is telescoped onto the upper end of the brake lever 21, for rotating the controller rod 28, to thereby carry the ends of the lock bolt 31 into locking engagement with both or either one of the lock seats 34. Said hand piece 35 is provided with a cam pin 36, which works in an inverted V-shaped cam groove 37, formed in the brake lever 21. In the transverse portion of the hand piece 35 is formed an angular opening, through which the squared upper end of the rod 28 projects, thereby locking said rod to said hand piece, with freedom for endwise sliding movement, and for common rotary movement. Compressed between the upper end of the brake lever 21 and the top of the hand piece 35 is a helical spring 38, which tends to slide the hand piece 35 outward on the brake lever 21, thereby normally keeping the cam pin 36 at the apex of the cam groove 37. When the hand piece 35 is moved outward by the spring 38, the cam pin 36 and groove 37 cause said hand piece 35, and hence the controller rod 28, to rotate. Under this rotation of the controller rod 28, the lock bolt 31 is returned to normal position, or to a position which locks the arms 19 and 20 to the brake lever 21.

To simultaneously set the brakes, the brake lever 21 is drawn toward the operator and locked against return movement by the dog 22 and coöperating ratchet teeth 26. By pressing downward on the rod 28, the lock dog 22 is moved, against the tension of the spring 27, out of engagement with the ratchet teeth 26, thereby permitting the brake lever 21 to be returned to its normal position, to release the brakes.

To set the left hand brake, the lock rod 31 is moved endwise, out of engagement with the arm 19, by rotating the rod 28 through the hand piece 35, while the brake lever is in a normal position. After the lock bolt 31 is properly set, the brake lever 21 is drawn toward the operator, thereby rocking the shaft 14 in its bearings and, through the several connections previously described, setting the left hand brake. During this movement of the brake lever 21, the arm 19 and the sleeve 15 will remain in normal position. To set the right hand brake, the operation of the parts will be reversed from that just described.

What I claim is:

1. The combination with a vehicle having a differential drive, and independent brakes coöperating with the two traction wheels, of a brake lever, independent brake actuating connections, a clutch operative, at will, to simultaneously connect the said two brake actuating connections to said lever, or to connect either thereof to said lever, leaving the other free, means for locking said brake lever in different adjustments, and a common controller for actuating said clutch and said lever locking means, substantially as described.

2. The combination with a vehicle having a differential drive, and independent brakes coöperating with the two traction wheels, of a brake lever, independent brake connections, a clutch operative, at will, to simultaneously connect the said two brake actuating connections to said lever, or to connect either thereof to said lever, leaving the other free, means for locking said brake lever in different adjustments, a common controller for actuating said clutch and said lever locking means, and automatic means for returning said common controller to a normal position, substantially as described.

3. The combination with a vehicle, having a differential drive and independent brakes coöperating with the two traction wheels, of two rock shafts yieldingly held in normal position, independent brake connections to said shafts, a brake lever, a clutch operative, at will, to simultaneously connect said lever to said two shafts, or to connect the same to either thereof, leaving the other free, means for locking said lever in different adjustments, a common controller for actuating said clutch and said lever locking means, and automatic means for returning said controller to normal position, substantially as described.

4. The combination with a vehicle having a differential drive, and independent brakes coöperating with the two traction wheels, of two rock shafts yieldingly held in normal positions and having arms, independent brake connections to said shafts, a brake lever, a lock mounted on said lever, pawl and ratchet devices for locking said lever in different adjustments, a controller rod mounted on said lever and operative, at will, to release said pawl and ratchet devices, or to actuate said lock, to simultaneously connect said brake lever to said two arms or to connect the same to either thereof, leaving the other free, and automatic means for returning said rod to a normal position, substantially as described.

5. The combination with a vehicle having a differential drive, and independent brakes coöperating with the two traction wheels, of two rock shafts yieldingly held in normal positions and having arms, independent brake connections to said shafts, a brake lever loosely mounted between said arms, a ratchet bar on said vehicle, a pawl mounted on said lever for coöperation with said ratchet bar, a lock bolt slidably mounted in said lever, a controller rod mounted in said lever, and operative, at will, to move said pawl out of engagement with said ratchet bar, or to move said bolt into locking engagement with said arms or either thereof, leaving the other free, and means, including a cam pin and coöperating cam groove, for returning said rod to a normal position, substantially as described.

In testimony whereof I affix my signature in presence of two witnesses.

THEODORE N. NYGREN.

Witnesses:
EDITH E. HANNA,
HARRY D. KILGORE.